United States Patent
Johnson et al.

(10) Patent No.: US 10,436,447 B2
(45) Date of Patent: Oct. 8, 2019

(54) AUGMENTOR VANE ASSEMBLY OF A GAS TURBINE ENGINE WITH AN ADDITIVELY MANUFACTURED AUGMENTOR VANE

(71) Applicant: United Technologies Corporation, Farmington, CT (US)

(72) Inventors: Javier N. Johnson, East Hartford, CT (US); Chris Bates, Jupiter, FL (US); Eric Beach, Coventry, CT (US); Jorge I. Farah, Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 55 days.

(21) Appl. No.: 15/224,935

(22) Filed: Aug. 1, 2016

(65) Prior Publication Data

US 2018/0031241 A1 Feb. 1, 2018

(51) Int. Cl.
| | |
|---|---|
| *F23R 3/20* | (2006.01) |
| *F02K 3/10* | (2006.01) |
| *F01D 9/04* | (2006.01) |
| *F01D 9/06* | (2006.01) |
| *B33Y 10/00* | (2015.01) |
| *B33Y 80/00* | (2015.01) |

(Continued)

(52) U.S. Cl.
CPC ............... *F23R 3/20* (2013.01); *B33Y 10/00* (2014.12); *B33Y 80/00* (2014.12); *F01D 5/185* (2013.01);

(Continued)

(58) Field of Classification Search
CPC ...... F23R 3/20; F23R 3/12; F23R 3/14; F23R 3/16; F23R 3/18; F23R 3/22; F23R 3/28; F23R 3/283; F23R 3/286; F23R 2900/00004; F23R 2900/000017; F23R 2900/00018; B33Y 10/00; B33Y 80/00; F01D 5/185; F01D 9/041; F01D 9/06; F01D 9/065; F01D 25/305; F02K 3/10;

(Continued)

(56) References Cited

U.S. PATENT DOCUMENTS 4,887,425 A * 12/1989 Vdoviak ............... F23D 11/36
60/742
5,243,759 A * 9/1993 Brown ...................... B22C 9/10
164/122.1

(Continued)

FOREIGN PATENT DOCUMENTS

| EP | 1847684 A1 | 10/2007 |
|---|---|---|
| EP | 2743451 A1 | 6/2014 |

(Continued)

OTHER PUBLICATIONS

Bill Gunston, The Cambridge Aerospace Dictionary 2009, 2nd Edition, p. 745.*

(Continued)

*Primary Examiner* — Jason H Duger
(74) *Attorney, Agent, or Firm* — Bachman & LaPointe, P.C.

(57) ABSTRACT

An augmentor vane assembly of a gas turbine engine with an additively manufactured augmentor vane, the additively manufactured augmentor vane having a vane wall with integral longitudinal wall passages formed therein, at least one of the integral longitudinal wall passages including at least one entrance aperture and at least one exit aperture, the at least one exit aperture transverse to the integral longitudinal wall passage.

11 Claims, 5 Drawing Sheets

(51) Int. Cl.
*F01D 5/18* (2006.01)
*F23R 3/28* (2006.01)

(52) U.S. Cl.
CPC ............ *F01D 9/041* (2013.01); *F01D 9/06* (2013.01); *F02K 3/10* (2013.01); *F23R 3/286* (2013.01); *F05D 2220/32* (2013.01); *F05D 2230/12* (2013.01); *F05D 2230/20* (2013.01); *F05D 2230/22* (2013.01); *F05D 2230/31* (2013.01); *F05D 2230/53* (2013.01); *F05D 2240/12* (2013.01); *F05D 2260/20* (2013.01); *F05D 2260/232* (2013.01); *F05D 2300/17* (2013.01)

(58) Field of Classification Search
CPC ... F02K 3/08; F02K 3/105; F02K 3/11; F02K 1/17; F05D 2220/32; F05D 2220/323; F05D 2230/12; F05D 2230/20; F05D 2230/22; F05D 2230/31; F05D 2230/53; F05D 2240/12; F05D 2260/20; F05D 2260/232; F05D 2300/17; F05D 2230/10; F05D 2230/11; F05D 2230/13; F05D 2230/311; F05D 2320/312; F05D 2230/313; F05D 2230/314; F05D 2240/122; F02C 7/22; F02C 9/26; F01N 3/26; F01N 3/36
See application file for complete search history.

(56) References Cited

U.S. PATENT DOCUMENTS

| | | | |
|---|---|---|---|
| 6,125,627 A | 10/2000 | Rice et al. | |
| 6,668,541 B2 | 12/2003 | Rice et al. | |
| 6,895,756 B2 | 5/2005 | Schmotolocha et al. | |
| 7,117,839 B2 | 10/2006 | Horstin | |
| 7,137,255 B2 | 11/2006 | Schmotolocha et al. | |
| 7,424,805 B2 | 9/2008 | Johnson | |
| 7,448,199 B2 | 11/2008 | Johnson | |
| 7,475,545 B2 | 1/2009 | Johnson | |
| 7,481,059 B2 | 1/2009 | Andersson et al. | |
| 7,509,797 B2 | 3/2009 | Johnson | |
| 7,565,804 B1 | 7/2009 | Frash et al. | |
| 7,581,398 B2 | 9/2009 | Mayer et al. | |
| 7,730,714 B2 | 6/2010 | Wood et al. | |
| 7,762,077 B2 | 7/2010 | Pederson et al. | |
| 7,908,868 B2 | 3/2011 | Bunel et al. | |
| 7,997,080 B2 | 8/2011 | Harmon, Sr. et al. | |
| 8,092,175 B2 | 1/2012 | Beeck et al. | |
| 2002/0124615 A1 | 9/2002 | Beeck et al. | |
| 2014/0205454 A1 | 7/2014 | Giovannetti et al. | |
| 2015/0144496 A1* | 5/2015 | Morris | F01D 5/186 205/261 |
| 2016/0208648 A1* | 7/2016 | Farah | F01D 25/12 |

FOREIGN PATENT DOCUMENTS

| | | |
|---|---|---|
| GB | 759251 A | 10/1956 |
| WO | 2016198210 A1 | 12/2016 |

OTHER PUBLICATIONS

European Search Report dated Dec. 19, 2017 for corresponding European Patent Application 17184335.2.
European Search Report dated Apr. 12, 2018 for corresponding European Patent Application 17184335.2.

* cited by examiner

AUGMENTOR VANE ASSEMBLY OF A GAS TURBINE ENGINE WITH AN ADDITIVELY MANUFACTURED AUGMENTOR VANE

BACKGROUND

The present disclosure relates generally to a component with integral passages and more specifically to an additive manufactured component.

Many aerospace components such as struts, supports, leading edge and trailing edge components form enclosures with apertures therethrough for communication of fluids such as air or fuel. In scenarios where fuel is injected into airflow from an aerospace component, legacy designs typically involve a fuel tube inserted into the aerospace component. Relatively large racetrack orifices and seals are utilized to account for thermal growth differentials between the fuel tubes and vane walls. These orifices expose seals to high temperatures that require relatively high cost seals.

SUMMARY

An aerospace component according to one disclosed non-limiting embodiment of the present disclosure can include a wall with at least one integral longitudinal wall passage formed therein, the integral longitudinal wall passage including an entrance aperture and a multiple of exit apertures, the multiple of exit apertures transverse to the integral longitudinal wall passage.

A further embodiment of the present disclosure may include, wherein the component is a vane.

A further embodiment of the present disclosure may include, wherein the component is an augmentor vane.

A further embodiment of the present disclosure may include, wherein the entrance aperture is formed through an endwall.

A further embodiment of the present disclosure may include, wherein the wall and the integral longitudinal wall passage is additively manufactured.

A further embodiment of the present disclosure may include, wherein the entrance aperture is additively manufactured undersize.

A further embodiment of the present disclosure may include, wherein the exit aperture is additively manufactured undersize.

A further embodiment of the present disclosure may include, wherein the integral longitudinal wall passage extends for only a portion of a length of the wall.

A further embodiment of the present disclosure may include, wherein the wall is cast and the integral longitudinal wall passage is drilled therethrough.

A further embodiment of the present disclosure may include, wherein the multiple of exit apertures are formed directly through the wall.

A further embodiment of the present disclosure may include, wherein the multiple of exit apertures are seal less.

An augmentor vane according to one disclosed non-limiting embodiment of the present disclosure can include an additively manufactured wall with an integral longitudinal wall passage formed therein, the integral longitudinal wall passage including at least one entrance aperture and at least one exit aperture, the exit aperture transverse to the integral longitudinal wall passage.

A further embodiment of the present disclosure may include, wherein the entrance aperture is additively manufactured undersized.

A further embodiment of the present disclosure may include, wherein the multiple of exit apertures are additively manufactured undersized.

A further embodiment of the present disclosure may include, wherein the integral longitudinal wall passage extends for only a portion of a length of the wall.

A method of manufacture, according to one disclosed non-limiting embodiment of the present disclosure can include additively manufacturing a wall with an integral longitudinal wall passage formed therein, the integral longitudinal wall passage including at least one entrance aperture and at least one exit aperture, the exit aperture transverse to the integral longitudinal wall passage, the at least one entrance aperture and the at least one exit aperture additively manufactured undersized; and final machining the at least one entrance aperture and the at least one exit aperture.

A further embodiment of the present disclosure may include, wherein the final machining provides a desired flow rate.

A further embodiment of the present disclosure may include, wherein the final machining is performed via Electron Discharge Machining.

A further embodiment of the present disclosure may include flowing abrasive through the integral longitudinal wall passage prior to final machining.

A further embodiment of the present disclosure may include, wherein the exit aperture is seal-less.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
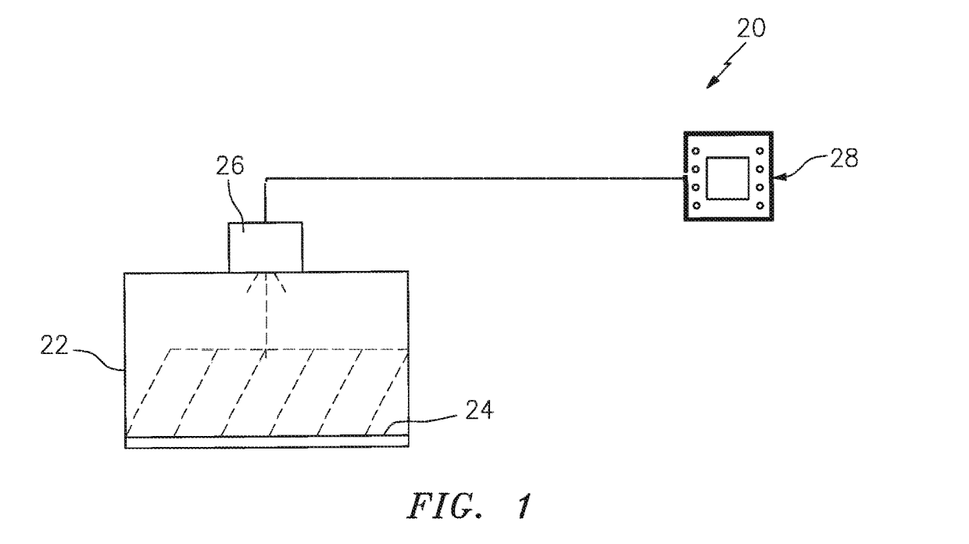
FIG. 1 is a general schematic view of an additive manufacturing system.

FIG. 1 schematically illustrates an additive manufacturing system 20. The system 20 generally includes a build chamber 22 with a powder bed 24, one or more energy sources 26 such as a laser and a control 28 (all illustrated schematically). It should be appreciated that as defined herein, "additive manufacturing" processes include, but are not limited to, selective laser melting (SLM), Direct Metal Laser Sintering (DMLS), Powder-Bed Electron Beam Melting (EBM), Electron Beam Free Form Fabrication (EBF3), Laser Engineered Net Shape (LENS) and others. Although particular additive manufacturing processes are disclosed, those skilled in the art of manufacturing will recognize that any other suitable rapid manufacturing methods using layer-by-layer construction or additive fabrication can alternatively be used.

The additive manufacturing process sequentially builds-up layers of atomized alloy and/or ceramic powder material that include but are not limited to, steel alloys, stainless steel alloys, titanium alloys, nickel alloys, aluminum alloys and others in atomized powder material form. Nickel alloys may have specific benefit for parts that operate in high temperature environments, such as, for example, environments typically encountered by aerospace and gas turbine engine components.

The additive manufacturing process fabricates or "grows" components using three-dimensional information, for example a three-dimensional computer model. The three-dimensional information is converted into a plurality of slices, each slice defining a cross section of the component for a predetermined height of the slice. The additive manufactured component is essentially "grown" slice-by-slice, or layer-by-layer, until finished. Each layer has an example size between about 0.0005-0.001 inches (0.0127-0.0254 mm). The additive manufacturing process facilitates manufacture of the relatively complex internal passage geometry to minimize assembly details, gun-drilling, and multi-component construction.

Figure 2:
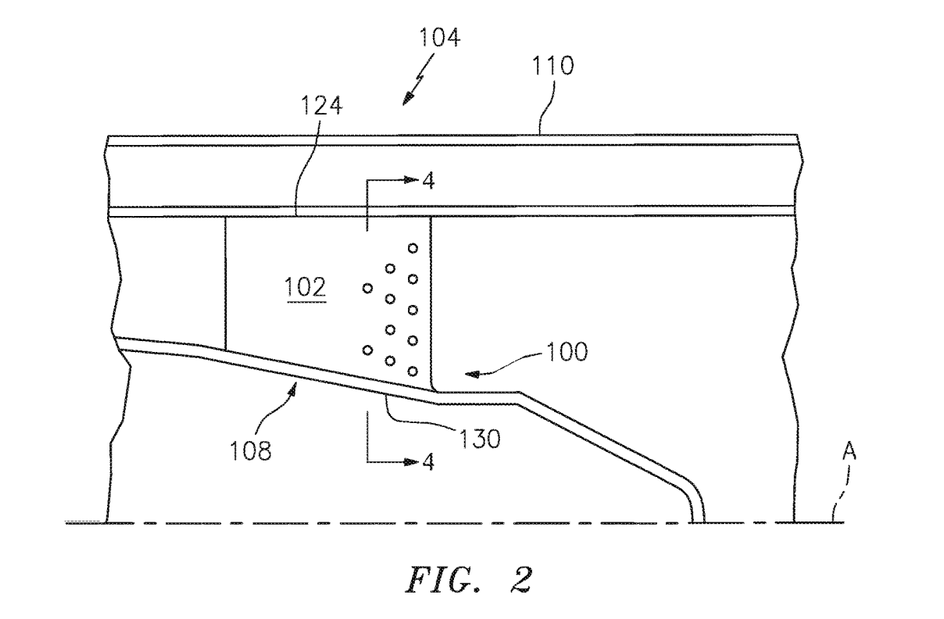
FIG. 2 is an expanded sectional view of an augmentor vane of the augmentor section.
Figure 3:
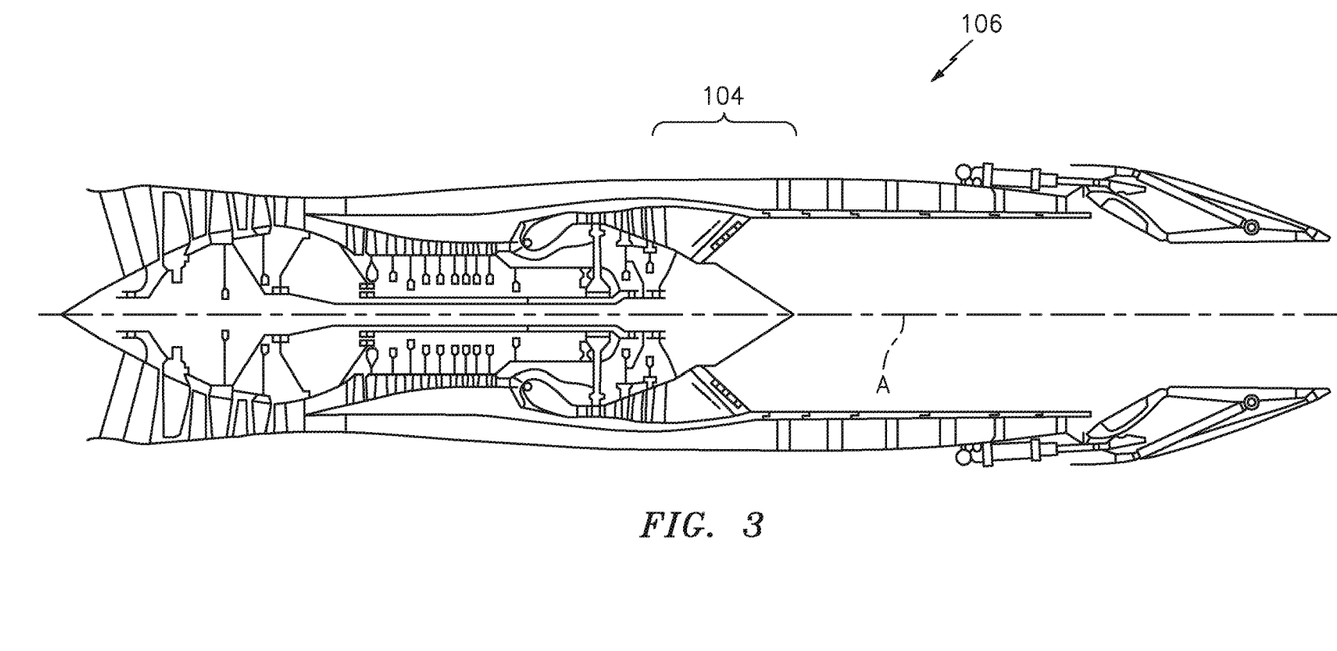
FIG. 3 is a general schematic view of an exemplary gas turbine engine embodiment for use with the augmentor vane of FIG. 2.

With reference to FIG. 2, one example aerospace component 100 is a trailing edge of an augmentor vane 102 in, for example, an augmenter section 104, turbine, or other section of a gas turbine engine 106 (illustrated schematically in FIG. 3). Although illustrated as an augmentor vane, other components that are attached to engine inlet sections, fan stators, compressor stators, guide vanes, intermediate cases, mid-turbine frames, turbine exhaust cases, augmentor, exhaust mixers and many others that may include thin walls with that contain conduits or other flow passages will also benefit herefrom.

The example augmentor vanes 102 are circumferentially arrayed and are fastened radially between a center body 108, and a turbine exhaust case (TEC) 110. Each vane 102 may be generally airfoil shaped. Due in part to the harsh environment, the strict alignment requirements, the relatively thin walls, the relatively complex internal fuel conduit structures and the requirement for numerous cooling and fuel apertures therethrough, the example aerospace component 100—and many others—may be manufactured via an additive manufacturing processes.

Figure 4:
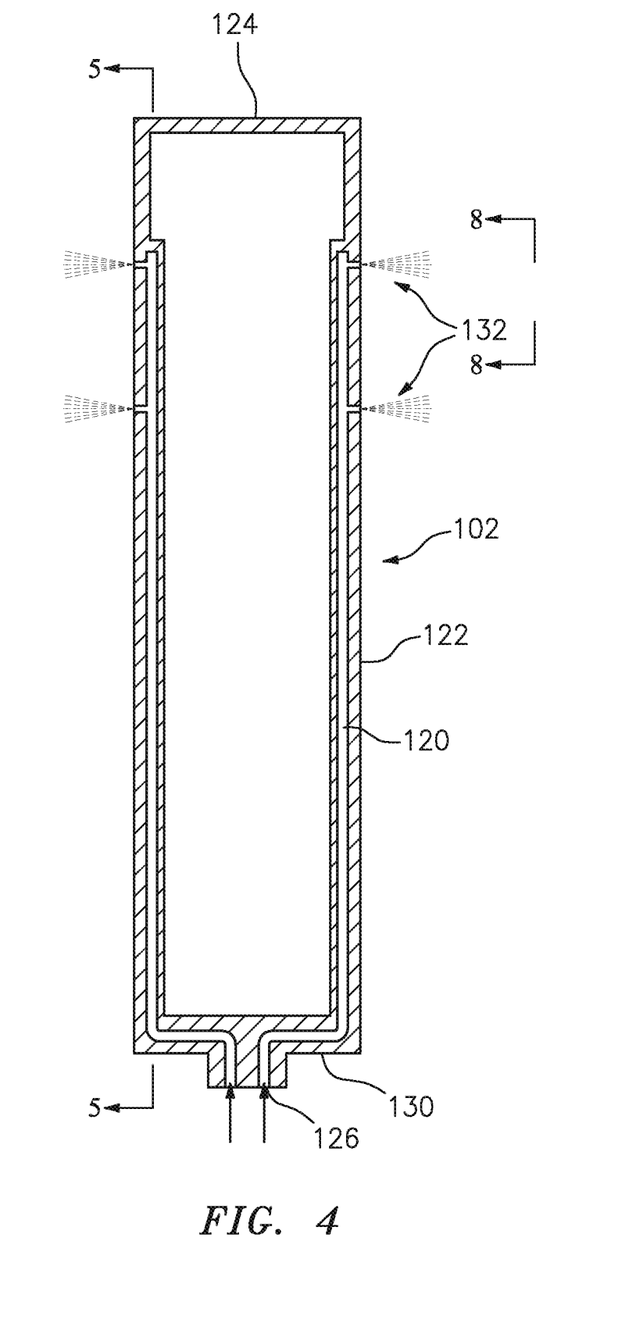
FIG. 4 is a sectional view of the augmentor vane taken along line 4-4 in FIG. 2.

With reference to FIG. 4, the example augmentor vane 102 includes an integral longitudinal wall passage 120 formed within the vane wall 122. In this example, the integral longitudinal wall passage 120 is a fuel passage that is additively manufactured into the vane wall 122 generally from a radial inboard end wall 130 adjacent to the center body 108 (FIG. 3) toward an end wall adjacent to the TEC 110 (FIG. 3). That is, the integral longitudinal wall passage 120 longitudinally extends within the vane wall 122 and may form a thickened area therein. While one integral longitudinal has been described, it will be appreciated from FIGS. 2, 4 and 5 that multiple such integral longitudinal wall passages 120 are formed in wall 122.

Figure 5:
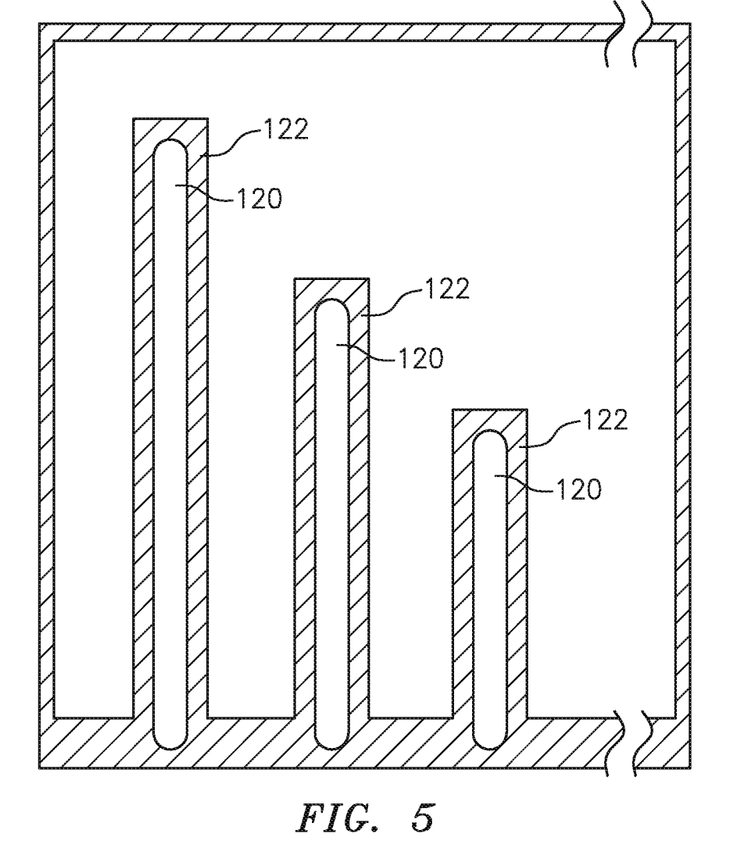
FIG. 5 is a sectional view of the augmentor vane taken along line 5-5 in FIG. 4.

Additive manufacturing facilitates manufacture of the integral longitudinal wall passage 120 that need not longitudinally extend to an end wall 124 (FIG. 5) to reduce coking and thermal stresses by removing unbeneficial material. That is, a drilled passage would necessarily be required to extend between the end walls 124, 130, which combination with vane wall 122 form an internal cavity of the vane 102 as shown in FIGS. 4-5. Alternatively, this design can be produced via casting or conventional machining methods if the integral longitudinal wall passage 120 extends between the end walls 124, 130 such that integral longitudinal wall passage 120 can then be cross-drilled and plug welded closed.

Figure 8:
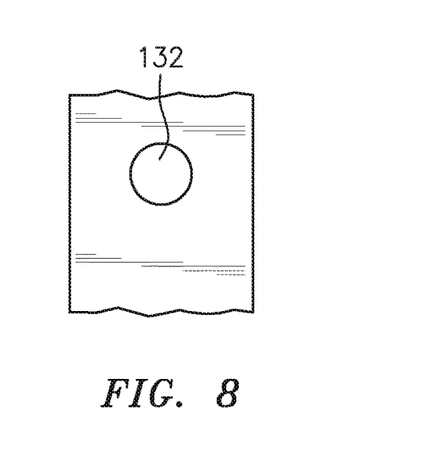
FIG. 8 is a face view of an aperture of the augmentor vane of FIG. 4.

The integral longitudinal wall passage 120 includes an entrance aperture 126, typically through a radially inboard or outboard end wall 130 transverse to the vane wall 122, and a multiple of exit apertures 132 (FIG. 8) that extend through the vane wall 122. The multiple of exit apertures 132 are generally transverse to the integral longitudinal wall passage 120 and may be shaped or otherwise configured to facilitate a desired fuel spray.

In one embodiment, the entrance aperture 126 and multiple of exit apertures 132 are additively manufactured undersized then final machined to provide a desired flow rate. The final machine operation may include Electron Discharge Machining (EDM) to avoid machining chips becoming trapped therein. The integral longitudinal wall passage 120 can alternatively or additionally be flowed with abrasive media to improve internal surface finish.

The entrance aperture 126 and multiple of exit apertures 132 provide the secondary purpose for the removal of residual powder from the additively manufacturing process. Alternatively, if produced via casting, a similar methodology can be applied for removal of the casting wax as opposed to DMLS powder. Alternatively, if produced from conventional machining, cross-drilling and plug welding removes concerns with internal fuel passage finish.

The integral production of the entrance apertures 126 and the multiple of exit aperture 132 (FIG. 8) readily facilitates the reshaping and/or relocation thereof. For example, improperly formed apertures may be plug welded and re-drilled.

Figure 6:
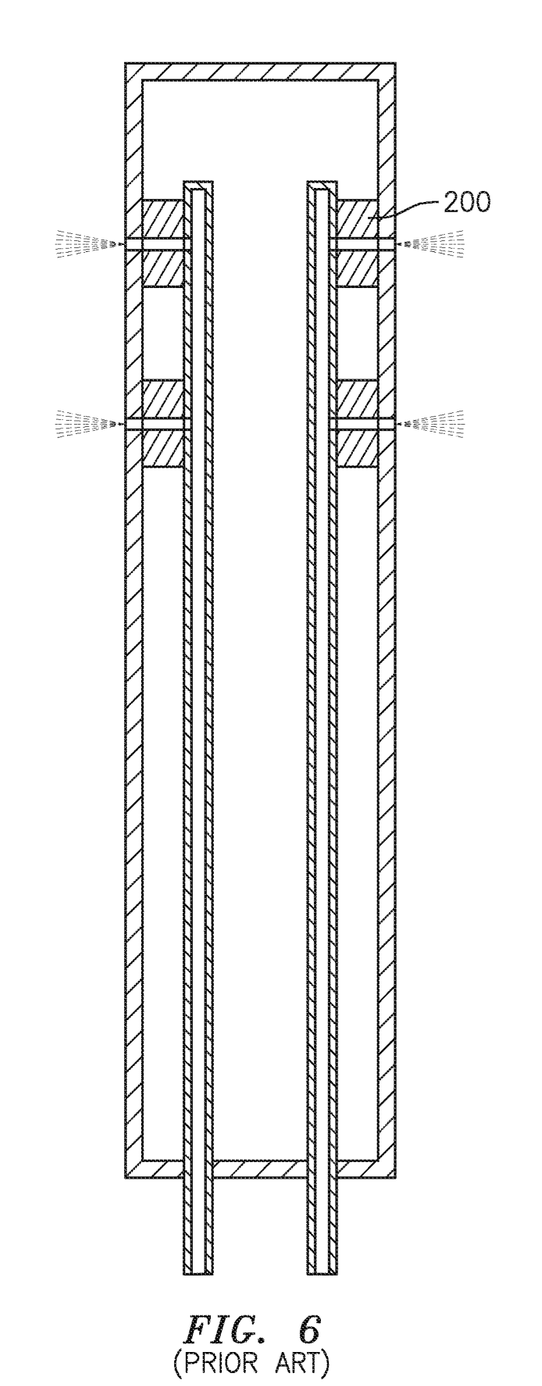
FIG. 6 is a sectional view of a RELATED ART augmentor vane taken along line 4-4 in FIG. 2.
Figure 7:
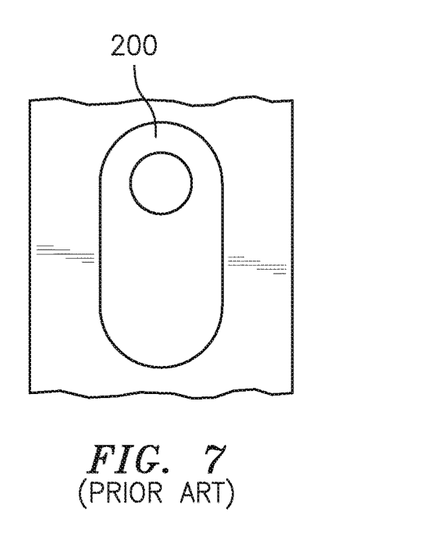
FIG. 7 is a face view of a RELATED ART aperture of the RELATED ART augmentor vane of FIG. 6.

The multiple of exit apertures 132, being drilled, additively manufactured, or otherwise directly formed in the vane 102, obviates the heretofore need for large racetrack orifices (FIGS. 6 and 7; RELATED ART) that are utilized to account for thermal growth differentials between fuel tubes and vane walls. That is, the seals can be eliminated and the fuel conduits combined integrally with the "strut-vane" part.

The integral longitudinal wall passages 120 expand the volume within the vane to increase cooling area or allow vane width to shrink which thereby reduces core flow blockage through vanes and reduces cooling air allocation. The integral longitudinal wall passages 120 reduce part count by not requiring separate fuel tubes and seals; reduce assembly/disassembly complexity through part count reduction; simplifies design resulting in reduced design and fabrication lead time; allow reshaping/relocation of holes anywhere along vane wall in line with fuel lines; allow increases in vane internal area for cooling air and/or allow vane width to decrease thereby reducing core flow blockage through vane pack; eliminate concern of fuel eclipsing in between fuel tube and vane walls; eliminate concern of fuel leakage into internal vane cavity; eliminate need for elliptical shaped holes in vane to account for thermal growth differential between fuel tubes and vane. Holes can now be designed to optimal shape; allows fuel to cool vane walls further reducing cooling air allocation required; facilitates repairable or rework-able apertures; and fuel post height can be tailored to minimize non-wetted (un-cooled) areas to prevent coking. Referring to FIGS. 2, 4-5, it will appreciated that the augmentor vane assembly includes directions (corresponding to a coordinate system of a three-dimensional space) including: a first direction; a second direction transverse to the first direction; and a third direction transverse to the first direction and to the second direction. The outboard endwall 130 and inboard endwall 124 both extend in the first direction (FIG. 4). Vane wall 122 extends from the inboard endwall 124 to the outboard endwall in the second direction (FIG. 4) and forms an exterior surface of the additively manufactured augmentor vane (FIG. 4). A first portion of the vane wall (left-hand portion of 122 in FIG. 4) has a first region adjacent the outboard endwall 130 and multiple second regions inboard thereof (FIGS. 4-5). As shown in FIG. 5, the multiple second regions are thickened in the first direction and spaced from each other in the third direction, and are spaced from the outboard endwall at different respective distances in the second direction (FIG. 5). A second portion of the vane wall is positioned opposite the first portion (right-hand portion of 122 in FIG. 4), and has a third region adjacent the outboard end 130 and a fourth region inboard thereof, the fourth region being thickened in the first direction with respect to the third region and spaced from the outboard endwall in the second direction (FIG. 4). As shown in FIGS. 4-5, an internal cavity of the additively manufactured augmentor vane is defined by the outboard endwall, the inboard endwall, the first portion of the vane wall and the second portion of the vane wall. A plurality of first ones of the fuel passages 120 are each formed in a respective one of the multiple second regions and extend in the second direction (FIG. 5). A second one of the fuel passages 120 is formed in the inboard endwall and in the fourth region (FIG. 4). The second fuel passage extends along the inboard endwall in the first direction and extends along the fourth region in the second direction.

The use of the terms "a" and "an" and "the" and similar references in the context of the description herein (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the structural member and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that the steps of the sequences and methods described herein may be performed in any order, separated or combined unless otherwise indicated and will still benefit from the present disclosure.

The foregoing description is exemplary rather than defined by the limitations within. Various non-limiting embodiments are disclosed herein. However, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. An augmentor vane assembly of an augmentor section of a gas turbine engine, the augmentor vane assembly having a first direction, a second direction transverse to the first direction, and a third direction transverse to the first direction and to the second direction, the augmentor vane assembly comprising:
    an additively manufactured augmentor vane fastened between a center body and a turbine exhaust case positioned outboard of the center body, wherein the additively manufactured augmentor vane is airfoil shaped and comprises:
        an outboard endwall and an inboard endwall both extending in the first direction;
        a vane wall extending from the inboard endwall to the outboard endwall in the second direction and forming an exterior surface of the additively manufactured augmentor vane,
        a first portion of the vane wall having a first region and multiple second regions, the multiple second regions thickened in the first direction, wherein the multiple second regions are spaced from each other in the third direction and spaced from the outboard endwall at different respective distances in the second direction, and
        a second portion of the vane wall positioned opposite the first portion, the second portion having a third region and a fourth region, the fourth region thickened in the first direction with respect to the third region and spaced from the outboard endwall in the second direction;
        an internal cavity of the additively manufactured augmentor vane defined by the outboard endwall, the inboard endwall, the first portion of the vane wall and the second portion of the vane wall;
        a plurality of first fuel passages each formed in a respective one of the multiple second regions and extending in the second direction; and
        a second fuel passage formed in the inboard endwall and in the fourth region, the second fuel passage extending along the inboard endwall in the first direction and extending along the fourth region in the second direction, and the second fuel passage including a plurality of fuel exit apertures extending transverse to the second direction directly through the second portion of the vane wall in the first direction.

2. The augmentor vane assembly as recited in claim 1, wherein an entrance aperture of the second fuel passage is formed in the inboard endwall.

3. The augmentor vane assembly as recited in claim 1, wherein the vane is an additively manufactured vane wall with the second fuel passage formed therein.

4. The augmentor vane assembly as recited in claim 1, wherein an entrance aperture of the second fuel passage is formed in the inboard endwall and sized to provide a desired flow rate.

5. The augmentor vane assembly as recited in claim 1, wherein each one of the plurality of fuel exit apertures does not include a seal.

6. The augmentor vane assembly as recited in claim 1, wherein the second fuel passage is inboard of the outboard endwall.

7. A method of manufacturing the augmentor vane assembly as recited in claim 1, comprising:
   additively manufacturing the additively manufactured augmentor vane by additively manufacturing the vane wall and forming at least one of the plurality of fuel exit apertures to a first size; and
   machining the at least one of the plurality of fuel exit apertures.

8. The method as recited in claim 7, wherein the machining of the at least one of the plurality of fuel exit apertures provides a desired flow rate.

9. The method as recited in claim 7, wherein the machining of the at least one of the plurality of fuel exit apertures is performed via electron discharge machining.

10. The method as recited in claim 7, further comprising flowing abrasive media through the second fuel passage prior to the machining of the at least one of the plurality of fuel exit apertures.

11. The method as recited in claim 7, wherein each one of the plurality of fuel exit apertures does not include a seal.

* * * * *